United States Patent Office.

H. E. FOWLER AND W. W. HOLMES, OF WALLINGFORD, CONNECTICUT.

Letters Patent No. 77,971, dated May 19, 1868; antedated May 4, 1868.

IMPROVEMENT IN THE MANUFACTURE OF PLATED SPOONS, FORKS, &c.

*The Schedule referred to in these Letters Patent and making part of the same.*

TO ALL WHOM IT MAY CONCERN:

Be it known that we, H. E. FOWLER and W. W. HOLMES, of Wallingford, in the county of New Haven, and State of Connecticut, have invented a new and useful Improvement in the Manufacture of Spoons, Forks, &c.; and we do hereby declare that the following is a full, clear, and exact description thereof, which will enable others skilled in the art to understand the same.

The present invention relates to the manufacture of spoons, forks, and other similar articles of table use heretofore made of silver or silver plate; and the invention consists in making spoons, forks, &c., of iron, by taking an iron-blank, similar in form to the blank in the manufacture of silver spoons, and placing it in a solution of zinc, one pound of sal-ammoniac, and one gallon of muriatic acid, where, having allowed it to remain for about five minutes, it is then taken out and put into a cylinder, in which, being heated, it is then thrown into tin, which so combines with and enters the pores of the iron-blank that when rolled, as in the manufacture of spoons from silver, its surface is perfectly smooth and even, and, if so desired, ready for being plated with silver, so that the spoon produced thereby will resemble the ordinary silver-plated spoons, and in many respects, and for many uses, far superior thereto, as is obvious without any further explanation.

Having thus described our invention, we claim as new, and desire to secure by Letters Patent—

The improvement in the manufacture of spoons, &c., from iron, substantially as herein described.

H. E. FOWLER,
W. W. HOLMES

Witnesses:
LEWIS MIX,
A. B. JACOCKS.